United States Patent
Coppola et al.

(10) Patent No.: US 12,155,266 B2
(45) Date of Patent: Nov. 26, 2024

(54) BRIDGELESS AND WEBLESS ROTOR ASSEMBLY USING POLYMER COMPOSITES

(71) Applicant: GM GLOBAL TECHNOLOGY OPERATIONS LLC, Detroit, MI (US)

(72) Inventors: Anthony Michael Coppola, Rochester Hills, MI (US); Alireza Fatemi, Canton, MI (US); Derek Frei Lahr, Howell, MI (US); Kestutis A. Sonta, Troy, MI (US); Alan G. Holmes, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 399 days.

(21) Appl. No.: 17/537,563

(22) Filed: Nov. 30, 2021

(65) Prior Publication Data

US 2023/0170746 A1    Jun. 1, 2023

(51) Int. Cl.
*H02K 1/02* (2006.01)
*H02K 1/276* (2022.01)

(52) U.S. Cl.
CPC ............. *H02K 1/02* (2013.01); *H02K 1/2766* (2013.01)

(58) Field of Classification Search
CPC .......... H02K 1/02; H02K 1/2766; H02K 5/08; H02K 15/03; H02K 1/276
See application file for complete search history.

(56) References Cited

U.S. PATENT DOCUMENTS

| | | | |
|---|---|---|---|
| 2017/0229934 A1* | 8/2017 | Rahman | H02K 1/2766 |
| 2018/0205273 A1* | 7/2018 | Büttner | H02K 15/03 |
| 2020/0287430 A1* | 9/2020 | Tago | B60T 13/74 |
| 2022/0131431 A1* | 4/2022 | Coppola | H02K 1/2766 |

OTHER PUBLICATIONS

U.S. Appl. No. 17/445,739, filed Aug. 24, 2021, Fatemi et al.

* cited by examiner

*Primary Examiner* — Christopher M Koehler
*Assistant Examiner* — Riley Owen Stout (57) ABSTRACT

A rotor assembly for a permanent magnet motor includes a first assembly including a first plurality of laminations and a second assembly including a second plurality of laminations. The first assembly is located radially inside of the second assembly. The first assembly and the second assembly define a first opening therebetween. First and second permanent magnets are located in the first opening. Polymeric material surrounds the first and second permanent magnets in the first opening. An outer layer surrounds the rotor assembly.

21 Claims, 8 Drawing Sheets

BRIDGELESS AND WEBLESS ROTOR ASSEMBLY USING POLYMER COMPOSITES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric machines, and more particularly to electric machines including a bridgeless and webless rotor assembly.

Electric vehicles such as battery electric vehicles (BEVs), fuel cell vehicles and hybrid vehicles include one or more electric machines. During operation, the electric machine is operated as a motor to propel the vehicle. The battery system can be recharged using utility power, by another vehicle, during regeneration and/or by an internal combustion engine (for hybrid vehicle applications). During operation, power that is generated during braking of the vehicle may be used to recharge a battery system of the vehicle. Instead of using mechanical brakes, the electric machine is operated as a generator to brake the vehicle and to generate power that is used to recharge the battery system.

The electric machine includes a rotor assembly with permanent magnets. The rotor assembly rotates within a stator during operation as a motor to produce torque or as a generator to produce power. Web and bridge structures are typically used for structural support in magnetic flux pathways. As can be appreciated, the rotor assembly needs to be robust since it is stressed by mechanical, electrical and magnetic force during operation.

SUMMARY

A rotor assembly for a permanent magnet motor includes a first assembly including a first plurality of laminations and a second assembly including a second plurality of laminations. The first assembly is located radially inside of the second assembly. The first assembly and the second assembly define a first opening therebetween. First and second permanent magnets are located in the first opening. Polymeric material surrounds the first and second permanent magnets in the first opening. An outer layer surrounds the rotor assembly.

In other features, a third assembly includes a third plurality of laminations, wherein the second assembly and the third assembly define a second opening therebetween. Third and fourth permanent magnets are located in the second opening. The polymeric material surrounds the third and fourth permanent magnets located in the second opening.

In other features, the rotor assembly does not include webs and wherein the rotor assembly does not include bridges. The outer layer is made of carbon fiber. The first opening is "V" shaped and extends to the outer layer. The polymeric material includes resin. The resin is selected from a group consisting of epoxy, polyurethane, polyester, bismaleimide, acrylic, cyanate ester, polyimide, phenolic, benzoxazine, and vinyl ester. The resin further includes a discontinuous fill material. The discontinuous fill material includes one or more materials selected from a group consisting of silica, alumina, minerals, boron nitride, aluminum nitride, silicon nitride, basalt, and glass fibers.

In other features, the first assembly includes a first sub-assembly including first ones of the first plurality of laminations and a second sub-assembly including second ones of the first plurality of laminations. The first sub-assembly and the second sub-assembly define a facing side surfaces including circumferential segments and other segments and wherein the circumferential segments define a larger gap than the other segments. The facing side surfaces of the first sub-assembly and the second sub-assembly define a stair-step pattern.

In other features, the first sub-assembly and the second sub-assembly include facing side surfaces including a circumferential segment and a diagonal segment and wherein the circumferential segment defines a larger gap than the diagonal segment. The first sub-assembly and the second sub-assembly include facing side surfaces including a circumferential segment, a diagonal segment, and a retention segment, and wherein the circumferential segment defines a larger gap than the diagonal segment. At least one of the first sub-assembly and the second sub-assembly defines a female opening and the other one of the first sub-assembly and the second sub-assembly defines a male projection that is received within the female opening.

In other features, the male projection is "T"-shaped and includes first and second arms. First and second gaps are defined between the first and second arms and the female opening. The polymeric material is located in the first and second gaps.

A rotor assembly for a permanent magnet motor includes a first assembly including a first plurality of laminations. A second assembly includes a second plurality of laminations, wherein the first assembly and the second assembly define a first opening therebetween. A third assembly includes a third plurality of laminations. The second assembly and the third assembly define a flux barrier therebetween. First and second permanent magnets are located in the first opening. Polymeric material surrounds the first and second permanent magnets in the first opening. A carbon fiber outer layer surrounds the rotor assembly. The rotor assembly does not include webs and wherein the rotor assembly does not include bridges.

In other features, the flux barrier includes polymeric material mixed with magnetic particles.

In other features, a fourth assembly includes a fourth plurality of laminations and third and fourth permanent magnets located in the second opening. The polymeric material surrounds the third and fourth permanent magnets located in the second opening. The third assembly and the fourth assembly define a second opening therebetween.

In other features, the first opening, the flux barrier and the second opening are "V" shaped and extend to the carbon fiber outer layer.

In other features, the polymeric material includes epoxy resin and a discontinuous fill material include one or more materials selected from a group consisting of silica, alumina, minerals, boron nitride, aluminum nitride, silicon nitride, basalt, and glass fibers.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A rotor assembly according to the present disclosure is characterized by a lack of web or bridge structures that are typically used for structural support of magnetic flux pathways. These web/bridge structures are replaced by a non-magnetic material such as polymer, which results in higher performance of the electric machine.

In some examples, the rotor assembly includes a radially inner assembly with a first plurality of laminations, a middle assembly including a second plurality of laminations and a radially outer assembly including a third plurality of laminations. Permanent magnets and a polymeric material are located between the radially inner assembly, the middle assembly and the radially outer assembly to hold the rotor assembly together. An outer ring made of carbon fiber or another material is arranged around an outer circumference of the rotor assembly to increase the strength of the rotor assembly.

In some examples, the polymeric material is pressurized during processing to pre-stress the outer ring (and the core/magnets). The permanent magnets are arranged between the radially inner assembly and the middle assembly and between the middle assembly and the radially outer assembly. The permanent magnets are in direct contact with the radially inner assembly, the middle assembly and the radially outer assembly.

In some examples, an air gap between the rotor and stator varies along the circumferential outer surface. Radially outer surfaces of the radially inner assembly are in closer proximity to the stator than the outer surfaces of the middle and radially outer assemblies.

In other examples, the polymer is adhesively (chemically or mechanically) bonded to surfaces of the laminations (e.g. e-steel laminations) such that it can transfer a traction of at least 5 MPa in tension.

In some examples, the radially inner assembly is divided into first and second sub-assemblies that are joined by a material such as polymer. The polymer layer thickness can vary to account for variations in magnet and e-steel surface position (variations within the manufacturing tolerance).

In some examples, the interface between the first and second sub-assemblies has a staircase arrangement that allows close spacing of the radial faces of the subassemblies and larger spacing between the circumferential faces. In other features, the first and second sub-assemblies are interlocked together.

Figure 1A:
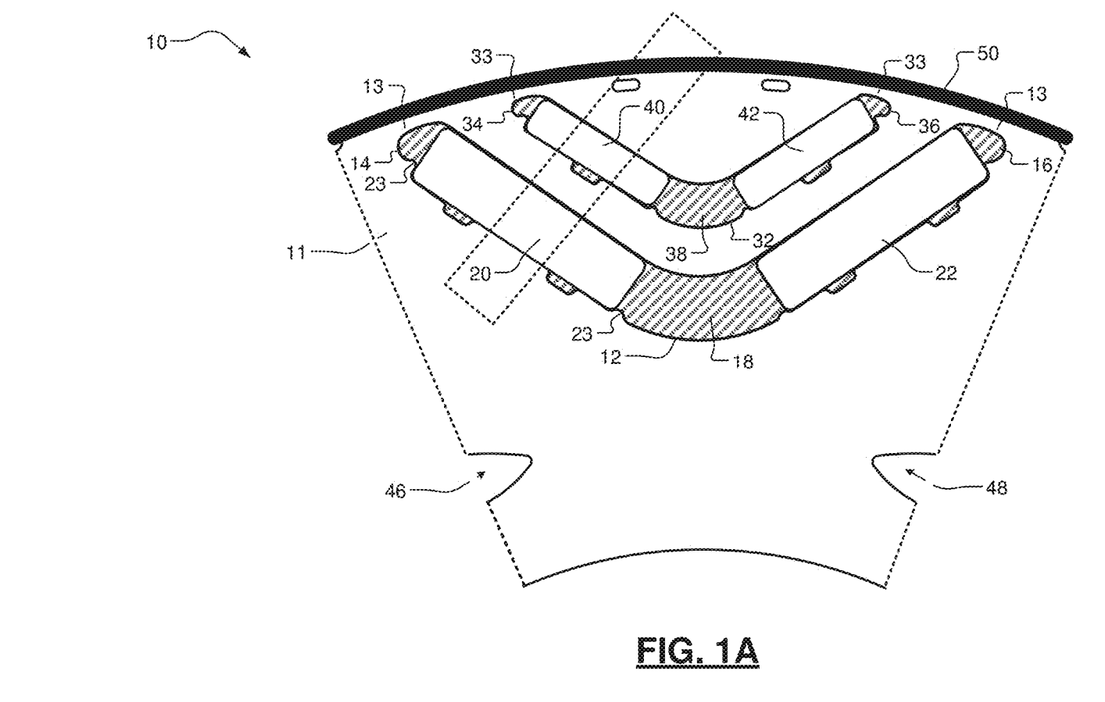
FIG. 1A is a side view of an example of a pole portion of a rotor assembly.

Referring now to FIG. 1A, a portion of an example of a rotor assembly 10 that is web-less is shown. The rotor assembly 10 includes a plurality of laminations 11 defining first V-shaped openings 12 (a single one is shown for one of the poles). In some examples, projections 23 extend into the first V-shaped openings 12 to position permanent magnets 20 and 22. Bridges 13 are located across radially outer portions 14 and 16 of the first V-shaped opening 12. The permanent magnets 20 and 22 are located in the first V-shaped opening 12. There are no webs located in a central portion 18 between the permanent magnets 20 and 22.

The plurality of laminations 11 also define second V-shaped openings 32 (a single one is shown for one of the poles). Bridges 33 are located across radially outer portions 34 and 36 of the second V-shaped opening 32. There are no webs located in a central portion 36 between permanent magnets 40 and 42. Permanent magnets 40 and 42 are located in the second V-shaped opening 32. There are no webs located in a central portion 38 of the second V-shaped opening 32. The plurality of laminations 11 may include notches 46 and 48 located on sides thereof.

A carbon fiber outer layer 50 has an interference fit onto the plurality of laminations 11 to reinforce the rotor assembly 10. The carbon fiber outer layer 50 generates tensile stress in the carbon fiber outer layer 50 and compressive stress in the lamination/polymer. This ensures that deflection of the rotor assembly is sufficiently low to avoid striking the stator. Compression stress in the lamination typically requires webs, magnets, or polymers to support the load.

In some examples, the permanent magnets typically have ~0.1 mm clearance with the openings in the laminations to allow insertion. Adding the carbon fiber outer layer 50 increases the effective air gap between the rotor and stator. Removal of the webs is important to maintaining performance. As will be described below, removal of bridges further improves performance.

Figure 1B:
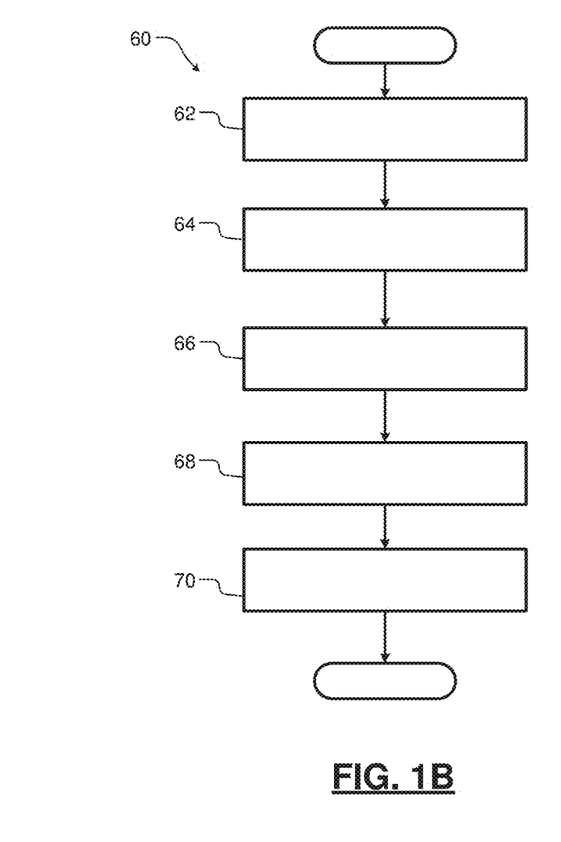
FIGS. 1B and 1C are examples of methods for manufacturing the rotor assembly of FIG. 1A.
Figure 1C:
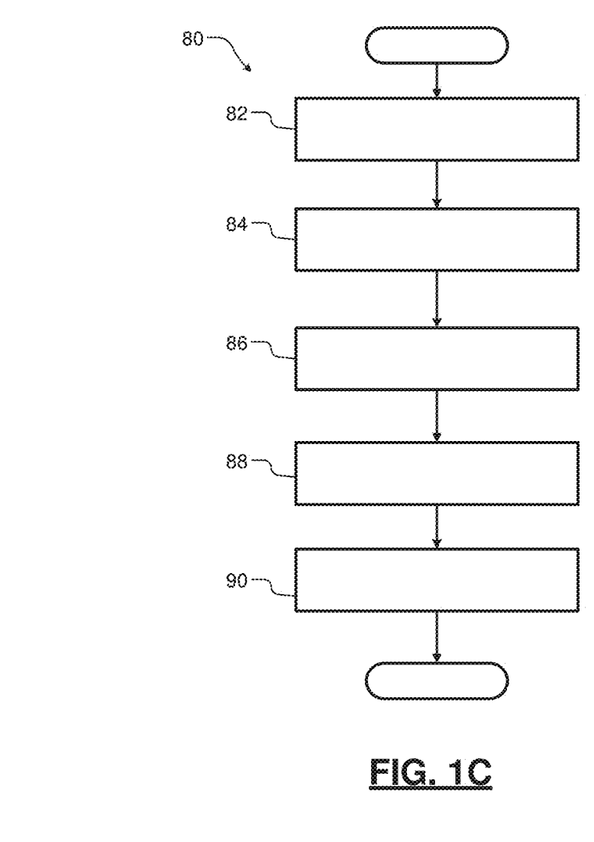

Referring now to FIGS. 1B and 1C, methods for manufacturing the rotor assembly are shown. In FIG. 1B, a method 80 involves creating a carbon fiber sleeve and then press fitting the rotor into the carbon fiber sleeve. At 62, the method includes winding carbon fiber filaments around a mandrel in the shape of the outer surface of the rotor assembly. At 64, resin is applied to the carbon fiber filaments and then cured. At 66, the carbon fiber sleeve is removed from the mandrel. At 68, the carbon fiber sleeve is cut to a predetermined length. At 70, the rotor is press fit into the carbon fiber sleeve.

Advantages of the method in FIG. 1B include easy to mass-produce long sleeves, interference stress is relatively straight-forward to generate and press-fitting is an assembly line-friendly process. Challenges with the method in FIG. 1B include high levels of interference that can be challenging to press-on without damaging the carbon fiber sleeve.

In FIG. 1C, the carbon fiber sleeve is wound directly onto the rotor assembly. At 82, the rotor assembly is mounted on a filament winder. At 84, the carbon fiber filaments are wound onto the rotor assembly using high tension. At 86, resin is applied to the carbon fiber filaments and cured. At 88, the rotor is removed from the filament winder. At 90, the outer diameter of the rotor assembly is optionally machined.

Advantages of the method in FIG. 1C include the elimination of machining of an inner diameter of the carbon fiber. There is also a potential for higher interfacial stress. Challenges with the method of FIG. 1C include the requirement for special winding equipment with high fiber tension. The time required to wind each rotor individually is relatively long (therefore this is most useful for low production volumes).

Figure 2A:
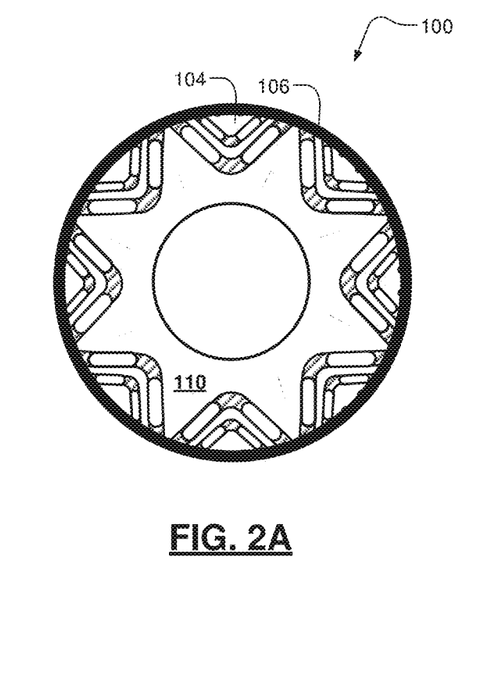
FIG. 2A is a side view of an example of a rotor assembly according to the present disclosure.
Figure 2B:
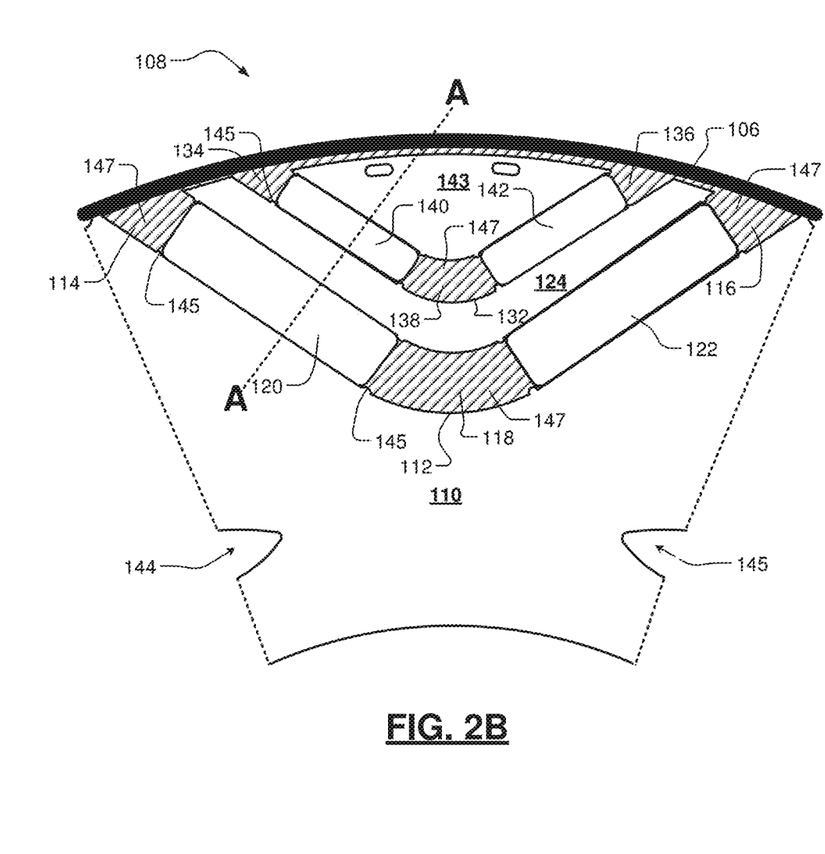
FIG. 2B is a side view of an example of a portion of a rotor assembly according to the present disclosure.

Referring now to FIGS. 2A and 2B, an example of a rotor assembly 100 is shown. In FIG. 2A, the rotor assembly 100 is shown to include multiple poles 104 and an outer sleeve 106 (such as a carbon fiber sleeve). In FIG. 2B, an example of a rotor portion 108 of the rotor assembly 100 is shown. In this example, the rotor portion 108 corresponds to a single pole and the rotor assembly 100 includes 8 poles, although additional or fewer poles can be used.

The rotor assembly 100 may include N sets of magnets arranged between (N+1) assemblies each including a plurality of laminations, where N is greater than or equal to one. In the example that follows below, the rotor assembly 100 includes N=2 sets of permanent magnets and N+1=3 sets of assemblies each including a plurality of laminations. As can be appreciated, N can be equal to 1, 2, 3, etc.

In the example in FIG. 2A, the rotor assembly 100 includes a radially inner assembly 110 including a first plurality of laminations, a middle assembly 124 including a second plurality of laminations and a radially outer assembly including 143 including a third plurality of laminations. In some examples, the radially inner assembly 110 is star-shaped and is common to all of the poles. The middle assembly 124 has a "V"-shaped cross-section and the radially outer assembly 143 has a generally triangular cross-section with an arcuate, radially outer surface. Radially outer ends of the middle assembly 124 and the radially outer arcuate surface are located radially inwardly of radially outer edges of the radially inner assembly 110.

A first V-shaped opening 112 is defined between the radially inner assembly 110 and the middle assembly 124. A second "V"-shaped opening 132 is defined between the middle assembly 124 and the radially outer assembly 143. Permanent magnets 120 and 122 are located in the first V-shaped opening 112 and permanent magnets 140 and 142 are arranged in the second "V"-shaped opening 132. Projections 145 may be arranged on surfaces of the radially inner assembly 110, the middle assembly 124 and the radially outer assembly 143 to help position the permanent magnets 120, 122, 140 and 142. The first plurality of laminations of the radially inner assembly 110 may include notches 144 and 145 located on sides thereof.

Polymeric material 147 fills open spaces in the first V-shaped opening 112, the second V-shaped opening 132 and radially outside of the radially outer arcuate surface of the radially outer assembly 143. More particularly, the polymeric material 147 fills radially outer portions 114 and 116 of the first "V"-shaped opening 112, a center portion 118 between the permanent magnets 120 and 122 and/or in other open areas. The polymeric material 147 fills radially outer portions 134 and 136 of the second "V"-shaped opening 132, a center portion 138 between the permanent magnets 140 and 142 and/or in other open areas.

A carbon fiber outer layer 106 has an interference fit onto an outer surface of the rotor assembly 100. As can be appreciated, the webs and bridges are omitted and are replaced with the polymeric material 147. In some examples, the polymeric material 147 includes an adhesive polymer composite material. In some examples, the polymeric material 147 includes resin such as polymeric resin or thermosetting resin. In some examples, the resin is selected from a group consisting of epoxy, polyurethane, polyester, bismaleimide, acrylic, cyanate ester, polyimide, phenolic, benzoxazine, and vinyl ester. In some examples, epoxy resin with a discontinuous fill material, such silica, alumina, minerals, boron nitride, aluminum nitride, silicon nitride, basalt, and glass fibers, is used. In some examples, the polymeric material 147 has high strength (>50 MPa or >100 MPa), high modulus (>10 GPa), high temperature resistance (Tg>150° C.), and strong adhesion toe-steel (>15 MPa).

In some examples, the laminations are made using e-steel by stamping or machining for prototypes, although other materials or processes can be used. The elimination of the webs and bridges means that the lamination is no longer a single piece. In some examples, there are 1+2*P lamination assemblies per rotor assembly, where P is the number of poles. These pieces may be stamped in their respective position from the sheet of material or nested more closely together to allow for better utilization of the material.

Figure 2C:
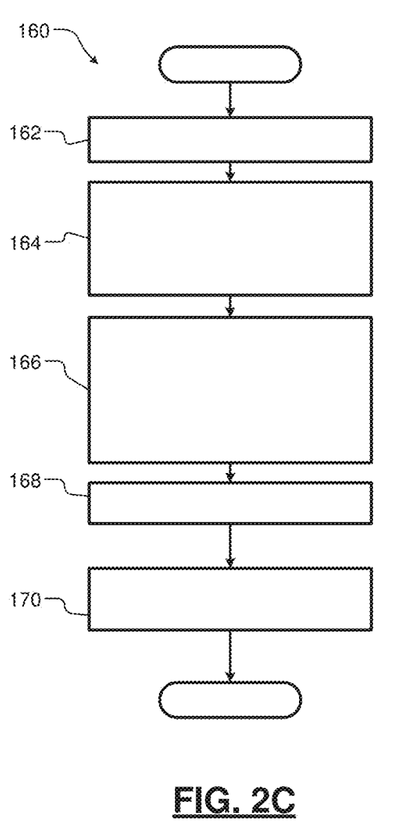
FIG. 2C is an example of a method for manufacturing the rotor assembly of FIG. 2A.

Referring now to FIGS. 2C, example fabrication procedures are shown. A method 160 includes stamping the lamination shapes at 162. At 164, adhesive is used to bond a plurality of lamination pieces into sub-assemblies with a predetermined thickness. In some examples, mechanical interlocks are used to join the pieces together instead of or in addition to the adhesive. For example, the predetermined thickness can be in a range from 10-100 layers.

At 166, the magnets and lamination sub-assemblies are inserted into a mold. The carbon fiber outer layer can optionally be inserted into the mold. At 168, the mold is filled with resin to adhere the pieces together. At 170, the resin is cured and then the rotor assembly is removed from the mold.

When the carbon fiber outer layer is added after molding, it can be assembled by press-fitting or overwrapping. When the carbon fiber outer layer is placed in the mold, the pre-stressing is accomplished by exerting pressure on the polymeric material 147 to store elastic energy in the carbon fiber outer layer. The polymeric material 147 pushes on the carbon fiber outer layer to pre-stress the carbon fiber outer layer. The stress is largely retained after curing. However, some stress would be lost due to cure shrinkage of the polymeric material 147.

Referring now to FIGS. 3 to 6, various examples of adjacent layers of the rotor assembly (along A-A in FIG. 2B) are shown. In a first stack 150 in FIG. 3, the layers are as follows: the carbon fiber layer 106, the laminations of the radially outer assembly 143, a polymeric layer 152, the permanent magnet 140, a polymeric layer 154, the laminations of the middle assembly 124, a polymeric layer 156, the permanent magnet 120, a polymeric layer 158 and the laminations of the radially inner assembly 110.

Figure 4:
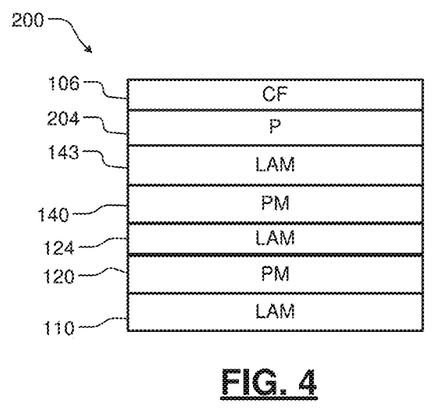

In a second stack 200 in FIG. 4, the layers are as follows: the carbon fiber layer 106, a polymeric layer 204, the laminations of the radially outer assembly 143, the permanent magnet 140, the laminations of the middle assembly 124, the permanent magnet 120, and the laminations of the radially inner assembly 110.

Figure 5:
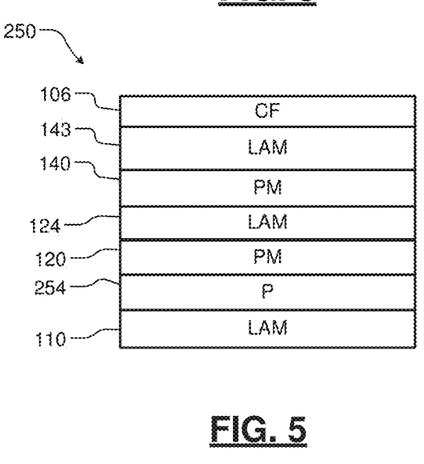

In a third stack 250 in FIG. 5, the layers are as follows: the carbon fiber layer 106, the laminations of the radially outer assembly 143, the permanent magnet 140, the laminations of the middle assembly 124, the permanent magnet 120, a polymeric layer 254 and the laminations of the radially inner assembly 110.

Figure 6:
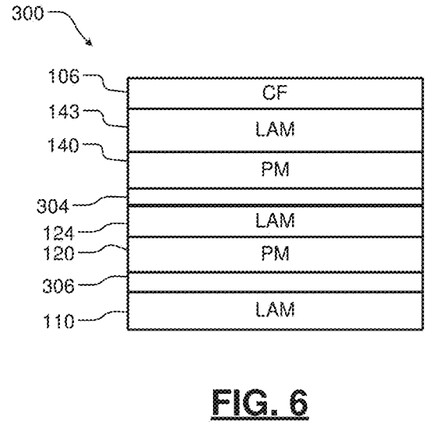

In a fourth stack 300 in FIG. 6, the layers are as follows: the carbon fiber layer 106, the laminations of the radially outer assembly 143, the permanent magnet 140, a polymeric layer 304, the laminations of the middle assembly 124, the permanent magnet 120, a polymeric layer 306 and the laminations of the radially inner assembly 110.

Figure 3:
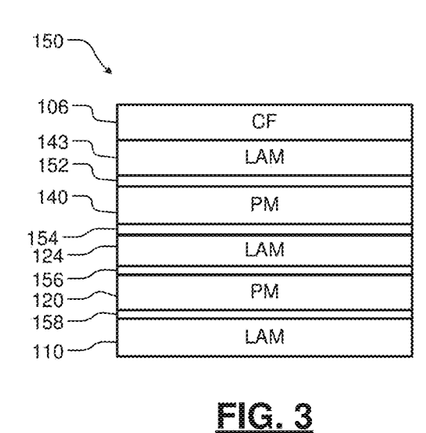
FIGS. 3 to 6 are cross-sectional views of example layouts of stacks of adjacent layers of the rotor assembly according to the present disclosure.

The tolerance stack-up of the lamination sub-assemblies and magnets may cause variation in the position of components of the rotor assembly. In some examples, the carbon fiber layer 106 contacts a uniform cylindrical surface to increase the strength of the carbon fiber outer layer. The polymeric material can be used to position the components and take up gaps in the stack-up to create the uniform cylindrical surface. If the polymeric material is injected into the flux barrier regions (near the magnets), then everything will be pushed to the exterior of the mold (e.g. see FIGS. 3, 5 and 6). FIGS. 3, 5 and 6 are slight variations on each other that may occur depending on injection parameters.

If the polymeric material 147 is injected on the outer diameter surface, then everything will be pushed towards the center of the rotor (FIG. 4) resulting in a variable air gap. The variable air gap in FIG. 4 increases the magnet utilization and increases the reluctance torque.

Figure 7:
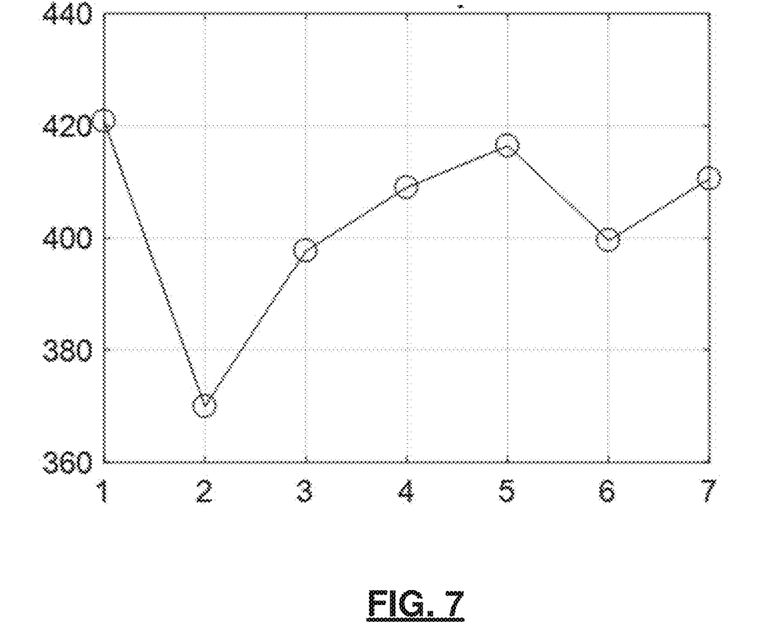
FIGS. 7 and 8 are graphs illustrating base torque and top speed power for different configurations of the rotor assembly.
Figure 8:
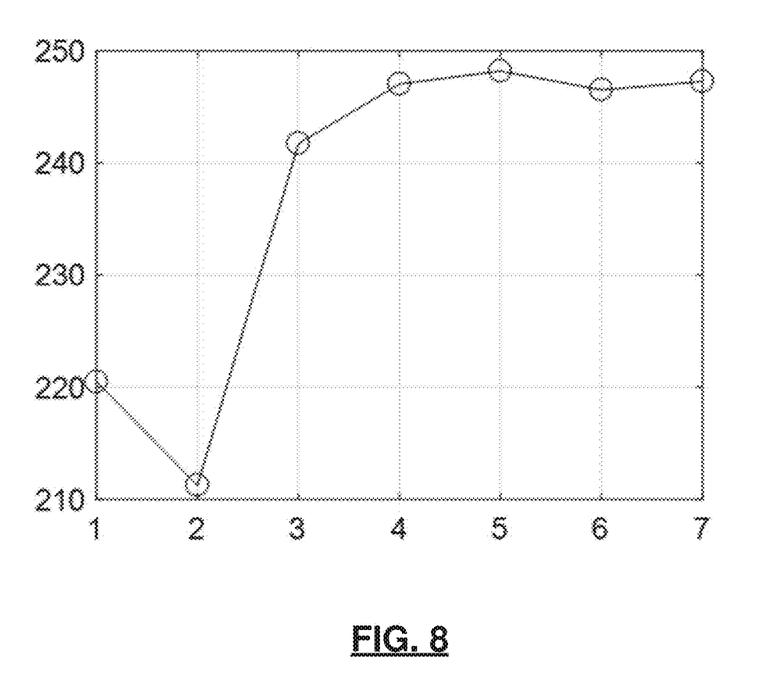

Referring now to FIGS. 7 and 8, base torque and power output at top speed are shown for different configurations of the rotor assembly. Option 1 corresponds to a rotor stack with webs and bridges. Option 2 corresponds to a rotor stack with webs, bridges and a carbon fiber outer layer. Option 3 corresponds to a rotor stack with the carbon fiber outer layer and without a web and with a thinner bridge. Option 4 corresponds to a rotor stack with the carbon fiber outer layer and without webs or bridges (FIG. 3). Option 5 corresponds to a rotor stack with the carbon fiber outer layer and without webs, bridges and clearance. Option 6 corresponds to a rotor stack with the carbon fiber outer layer and without webs, bridges, and clearance, w/variable gap (FIG. 4). Option 7 corresponds to a rotor stack with the carbon fiber outer layer, without webs and bridges, and with tolerances stacked behind large permanent magnets (FIG. 5). As can be seen, significant improvement in base torque and top speed power occur when the webs and bridges are removed.

Figure 9:
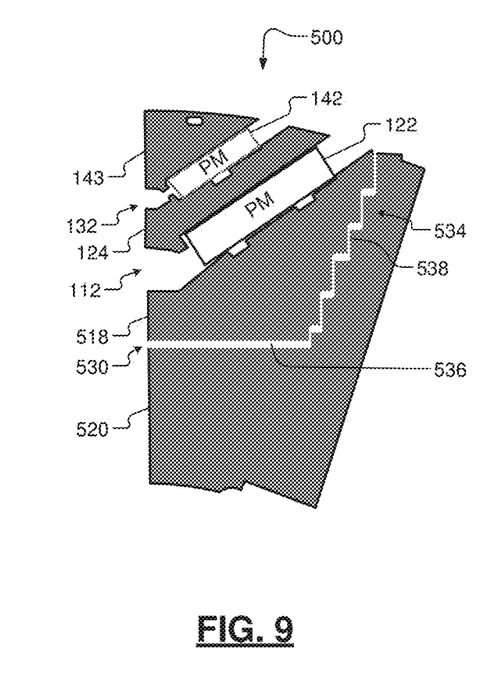
FIGS. 9-12 are side views of additional examples of pole portions of rotor assemblies according to the present disclosure.
Figure 10:
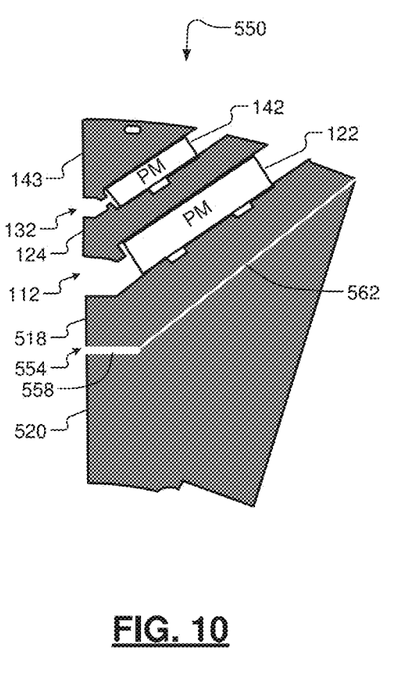
Figure 11:
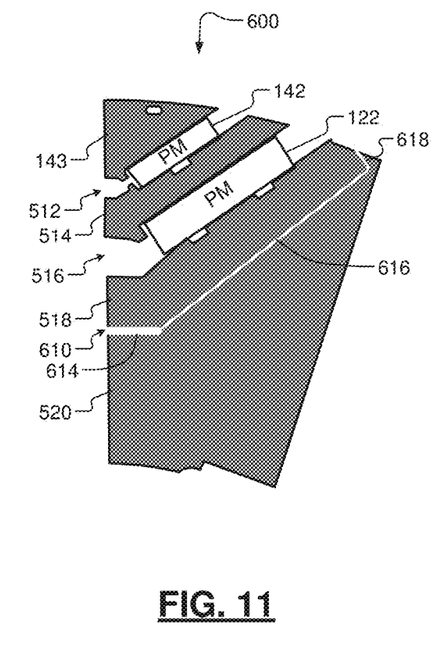

Referring now to FIGS. 9-11, a right side half of pole portions of additional rotor assemblies are shown. In FIG. 9, the radially inner assembly of a rotor assembly 500 is further divided into a first sub-assembly 518 including a fourth plurality of laminations and a second sub-assembly 520 including a fifth plurality of laminations. A gap 530 is defined between the first sub-assembly 518 and the second sub-assembly 520. In some examples, the gap 530 has a stair-stepped shaped with circumferential extending portions 538 and radially extending portions 534. In some examples, the circumferential extending portions 538 are wider than and the radially extending portions 534 to allow additional movement in a radial direction.

An alternative method of handling challenges caused by tolerance stack-up is to split the radially inner assembly into the first sub-assembly 518 and the second sub-assembly 520. A high permeability magnetic flux path can be maintained between the first sub-assembly 518 and the second sub-assembly 520 using the staircase shape in FIG. 9. In this design, the radial surfaces are in close proximity while the circumferential surfaces can move in and out to handle the tolerance variations in the magnet region.

In some examples, a magnetic polymeric material is arranged between the first sub-assembly 518 and the second sub-assembly 520 to retain some of the magnetic flux permeability. In some examples, the second sub-assembly 520 can be made using a soft magnet composite or other alternate material in this configuration.

Referring now to FIG. 10, the radially inner assembly of a rotor assembly 550 is further divided into a first sub-assembly 518 including a fourth plurality of laminations and a second sub-assembly 520 including a fifth plurality of laminations. A gap 544 is defined between the first sub-assembly 518 and the second sub-assembly 520. In some examples, the gap 544 includes a circumferential extending portion 558 and diagonally extending portion 562. In some examples, a gap defined by the circumferential extending portion 558 is wider than and a gap defined by the diagonally extending portion 562 to allow additional movement in a radial direction.

Referring now to FIG. 11, the radially inner assembly of a rotor assembly 600 is further divided into a first sub-assembly 518 including a fourth plurality of laminations and a second sub-assembly 520 including a fifth plurality of laminations. A gap 610 is defined between the first sub-assembly 518 and the second sub-assembly 520. In some examples, the gap 610 includes a circumferential extending portion 614, a radially extending portion 616 and a retention portion 618. In some examples, the retention portion 618 forms an angle with respect to the diagonally extending portion 616. In some examples, the angle is in a range from 70 to 110°, although other angles can be used. In some examples, a gap defined by the circumferential extending portion 614 is wider than and a gap defined by the diagonally extending portion 616 and the retention portion 618 to allow additional movement in a radial direction.

Figure 12:
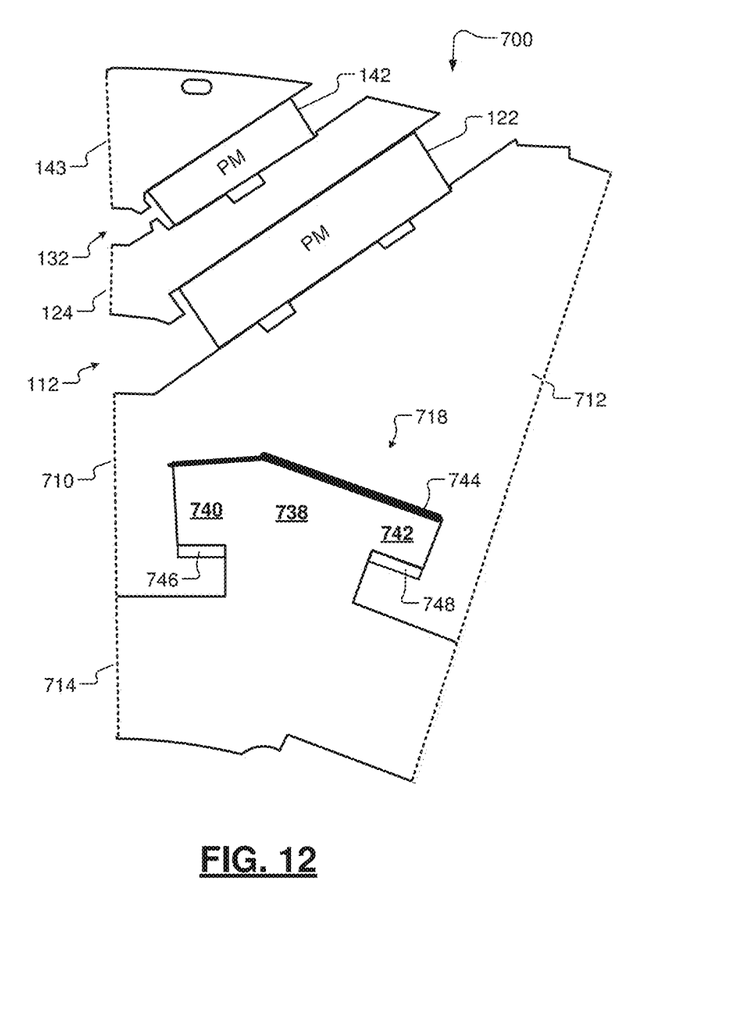

Referring now to FIG. 12, a rotor assembly includes a radially inner assembly that is split into a first sub-assembly 710 and a second sub-assembly 714. The first sub-assembly 710 and the second sub-assembly include mating features 718 that interlock. For example, the second sub-assembly 714 includes a male portion 738 (e.g. "T"-shaped portion including arms 740 and 742) that is received by a female portion 744 (e.g. complementary "T"-shaped opening 744 in the first sub-assembly 710), although other mating shapes can be used. In some examples, circumferential gaps 746 and 748 are arranged between the arms 740 and 742, respectively, and corresponding surfaces of the "T"-shaped opening 744. In some examples, the circumferential gaps 746 and 748 are filled with polymeric material.

The rotor includes multiple laminate assemblies (e.g. 143, 124 and 710) that are movable to accommodate tolerances and to eliminate air gaps. The radially movable laminate assembly (e.g. 712) is designed to take up clearance between poles to maintain flux continuity. Interlocking features transmit centrifugal loads to/from the outer assemblies to inner assemblies. In some examples, the circumferential gaps 746 and 748 are filled with polymeric material to carry some load of the laminated assemblies instead of relying solely on the carbon fiber outer layer.

Advantages include the use of separate laminated assemblies that enable better utilization of the stock since parts can be nested more closely together. Separate laminated assemblies also enable the use of grain oriented steels.

Figure 13:
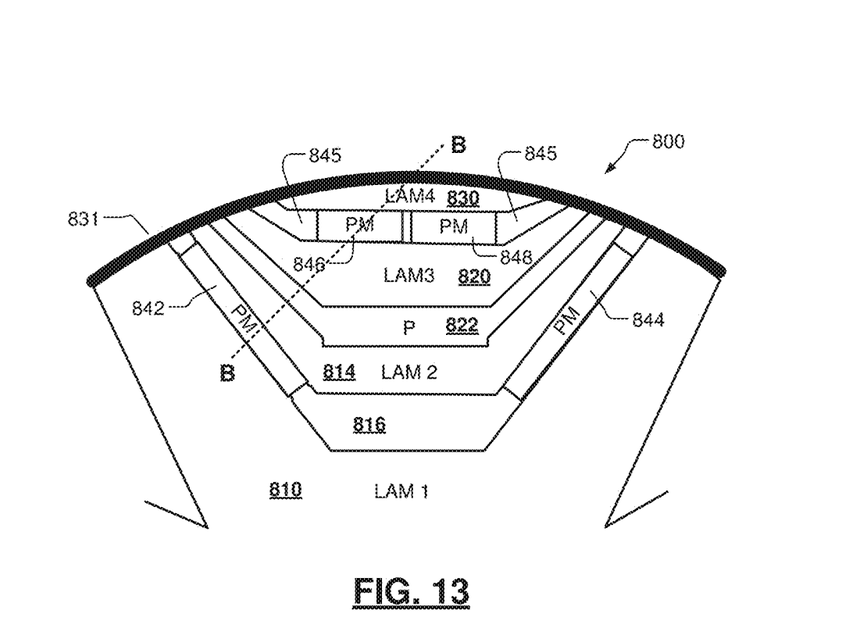
FIG. 13 is a side view of an example of a pole portion of a rotor assembly according to the present disclosure.

Referring now to FIG. 13, another example of a rotor assembly 800 according to the present disclosure is shown. Another alternate method to address the variable tolerances involves absorbing the gap in an empty flux barrier layer (not including magnets). In some examples, polymeric material in the flux barrier layer includes magnetic particles to ensure flux path continuity for the permanent magnets in the other slots.

The rotor assembly 800 includes a radially inner assembly 810 including a first plurality of laminations, a second assembly 814 including a second plurality of laminations, a third assembly 820 including a third plurality of laminations, and a radially outer assembly 830 including a fourth plurality of laminations.

In some examples, the second assembly 814 and the third assembly 820 have "V"-shaped cross-sections. The radially outer assembly 830 has a generally planar cross-section with an arcuate, radially outer surface.

A first V-shaped opening 816 is defined between the radially inner assembly 810 and the second assembly 814. A second "V"-shaped opening 822 is defined between the second assembly 814 and the third assembly 820. A third "V"-shaped opening 845 is defined between the third assembly 820 and the radially outer assembly 830. Permanent magnets 842 and 844 are located in the first V-shaped opening 112 and permanent magnets 846 and 848 are arranged in the third "V"-shaped opening 845. Polymeric material is arranged in open spaces in the first V-shaped opening 816, the third V-shaped opening 845. A carbon fiber outer layer 831 has an interference fit onto an outer surface of the rotor assembly 800.

Figure 14:
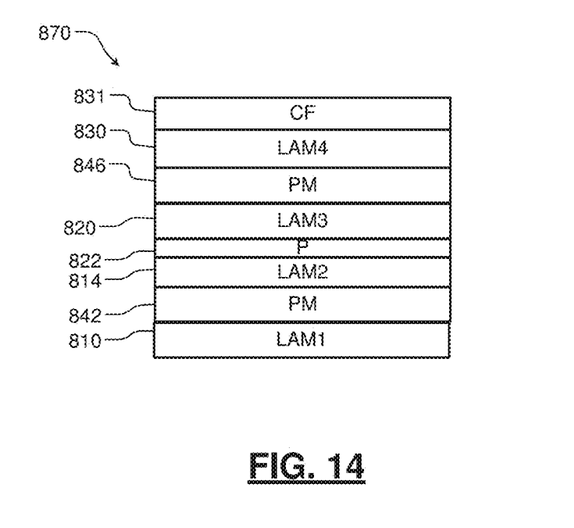
FIG. 14 is cross-sectional view of an example layout of a stack of adjacent layers of the rotor assembly of FIG. 13 according to the present disclosure.

Referring now to FIG. 14, a stack 870 corresponding to the rotor assembly 800 is shown. The stack 870 includes the carbon fiber outer layer 831, the radially outer assembly 830, the permanent magnet 846, the third assembly 820, the polymeric layer 822, the second assembly 814, the permanent magnet 842 and the radially inner assembly 810.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A rotor assembly for a permanent magnet motor, comprising:
    a first assembly including a first plurality of laminations;
    a second assembly including a second plurality of laminations,
    wherein the first assembly is located radially inside of the second assembly and wherein the first assembly and the second assembly define a first opening therebetween;
    first and second permanent magnets located in the first opening;
    polymeric material surrounding the first and second permanent magnets in the first opening;
    an outer layer surrounding the rotor assembly;
    a third assembly including a third plurality of laminations, wherein the second assembly and the third assembly define a second opening therebetween; and
    third and fourth permanent magnets located in the second opening,
    wherein the polymeric material surrounds the third and fourth permanent magnets located in the second opening,
    wherein the first assembly includes a first sub-assembly including first ones of the first plurality of laminations and a second sub-assembly including second ones of the first plurality of laminations,
    wherein the first sub-assembly and the second sub-assembly define a facing side surfaces including circumferential segments and other segments and wherein the circumferential segments define a larger gap than the other segments, and
    wherein the facing side surfaces of the first sub-assembly and the second sub-assembly define a stair-step pattern.

2. The rotor assembly of claim 1, wherein the rotor assembly does not include webs and wherein the rotor assembly does not include bridges and wherein the outer layer is made of carbon fiber.

3. The rotor assembly of claim 1, wherein the first opening is "V" shaped and extends to the outer layer.

4. The rotor assembly of claim 1, wherein the polymeric material includes resin.

5. The rotor assembly of claim 4, wherein the resin is selected from a group consisting of epoxy, polyurethane, polyester, bismaleimide, acrylic, cyanate ester, polyimide, phenolic, benzoxazine, and vinyl ester.

6. The rotor assembly of claim 4, wherein the resin further includes a discontinuous fill material.

7. The rotor assembly of claim 6, wherein the discontinuous fill material includes one or more materials selected from a group consisting of silica, alumina, minerals, boron nitride, aluminum nitride, silicon nitride, basalt, and glass fibers.

8. The rotor assembly of claim 1, wherein the first sub-assembly and the second sub-assembly include facing side surfaces including a circumferential segment and a diagonal segment and wherein the circumferential segment defines a larger gap than the diagonal segment.

9. The rotor assembly of claim 1, wherein the first sub-assembly and the second sub-assembly include facing side surfaces including a circumferential segment, a diagonal segment, and a retention segment, and wherein the circumferential segment defines a larger gap than the diagonal segment.

10. The rotor assembly of claim 1, wherein at least one of the first sub-assembly and the second sub-assembly defines a female opening and the other one of the first sub-assembly and the second sub-assembly defines a male projection that is received within the female opening.

11. The rotor assembly of claim 10, wherein the male projection is "T"-shaped and includes first and second arms and further comprising first and second gaps defined between the first and second arms and the female opening and wherein the polymeric material is located in the first and second gaps.

12. A rotor assembly for a permanent magnet motor, comprising:
a first assembly including a first plurality of laminations;
a second assembly including a second plurality of laminations, wherein the first assembly and the second assembly define a first opening therebetween;
a third assembly including a third plurality of laminations, wherein the second assembly and the third assembly define a flux barrier therebetween;
first and second permanent magnets located in the first opening;
polymeric material surrounding the first and second permanent magnets in the first opening; and
a carbon fiber outer layer surrounding the rotor assembly, wherein the rotor assembly does not include webs and wherein the rotor assembly does not include bridges,
wherein the second assembly and the third assembly further define a second opening therebetween; and
third and fourth permanent magnets located in the second opening,
wherein the polymeric material further surrounds the third and fourth permanent magnets located in the second opening,
wherein the first assembly includes a first sub-assembly including first ones of the first plurality of laminations and a second sub-assembly including second ones of the first plurality of laminations,
wherein the first sub-assembly and the second sub-assembly define a facing side surfaces including circumferential segments and other segments and wherein the circumferential segments define a larger gap than the other segments, and
wherein the facing side surfaces of the first sub-assembly and the second sub-assembly define a stair-step pattern.

13. The rotor assembly of claim 12, wherein the flux barrier includes polymeric material mixed with magnetic particles.

14. The rotor assembly of claim 13, further comprising:
a fourth assembly including a fourth plurality of laminations; and
third and fourth permanent magnets located in a second opening,
wherein the polymeric material surrounds the third and fourth permanent magnets located in the second opening and wherein the third assembly and the fourth assembly define a second opening therebetween.

15. The rotor assembly of claim 13, wherein the first opening, the flux barrier and the second opening are "V" shaped and extend to the carbon fiber outer layer.

16. The rotor assembly of claim 12, wherein the polymeric material includes epoxy resin and a discontinuous fill material include one or more materials selected from a group consisting of silica, alumina, minerals, boron nitride, aluminum nitride, silicon nitride, basalt, and glass fibers.

17. A rotor assembly for a permanent magnet motor, comprising:
a first assembly including a first plurality of laminations;
a second assembly including a second plurality of laminations,
wherein the first assembly is located radially inside of the second assembly and wherein the first assembly and the second assembly define a first opening therebetween;
first and second permanent magnets located in the first opening;
polymeric material surrounding the first and second permanent magnets in the first opening;
an outer layer surrounding the rotor assembly;
a third assembly including a third plurality of laminations, wherein the second assembly and the third assembly define a second opening therebetween; and
third and fourth permanent magnets located in the second opening,
wherein the polymeric material surrounds the third and fourth permanent magnets located in the second opening,
wherein the first assembly includes a first sub-assembly including first ones of the first plurality of laminations and a second sub-assembly including second ones of the first plurality of laminations,
wherein at least one of the first sub-assembly and the second sub-assembly defines a female opening and the other one of the first sub-assembly and the second sub-assembly defines a male projection that is received within the female opening, and
wherein the male projection is "T"-shaped and includes first and second arms and further comprising first and second gaps defined between the first and second arms and the female opening and wherein the polymeric material is located in the first and second gaps.

18. The rotor assembly of claim 17, wherein the polymeric material includes resin.

19. The rotor assembly of claim 18, wherein the resin is selected from a group consisting of epoxy, polyurethane, polyester, bismaleimide, acrylic, cyanate ester, polyimide, phenolic, benzoxazine, and vinyl ester.

20. The rotor assembly of claim 18, wherein the resin further includes a discontinuous fill material.

21. The rotor assembly of claim 20, wherein the discontinuous fill material includes one or more materials selected from a group consisting of silica, alumina, minerals, boron nitride, aluminum nitride, silicon nitride, basalt, and glass fibers.

* * * * *